US012636706B2

(12) United States Patent
Watabe et al.

(10) Patent No.: US 12,636,706 B2
(45) Date of Patent: May 26, 2026

(54) SENSOR ATTACHMENT/DETACHMENT DEVICE, SENSOR ATTACHMENT/DETACHMENT SYSTEM, SENSOR ATTACHMENT METHOD AND SENSOR DETACHMENT METHOD

(71) Applicant: KABUSHIKI KAISHA TOSHIBA, Tokyo (JP)

(72) Inventors: Kazuo Watabe, Yokohama Kanagawa (JP); Keisuke Ueno, Kawasaki Kanagawa (JP); Hidefumi Takamine, Tokyo (JP); Yongfang Li, Kawasaki Kanagawa (JP); Takashi Usui, Saitama Saitama (JP); Junko Hirokawa, Tokyo (JP); Yuki Ueda, Yokohama Kanagawa (JP); Tetsuya Kugimiya, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 781 days.

(21) Appl. No.: 17/823,873

(22) Filed: Aug. 31, 2022

(65) Prior Publication Data

US 2023/0302542 A1 Sep. 28, 2023

(30) Foreign Application Priority Data

Mar. 22, 2022 (JP) ................................ 2022-044948

(51) Int. Cl.
*B23B 7/06* (2006.01)
*B23B 7/12* (2006.01)
*C09J 5/06* (2006.01)

(52) U.S. Cl.
CPC .................. *B23B 7/06* (2013.01); *B23B 7/12* (2013.01); *C09J 5/06* (2013.01)

(58) Field of Classification Search
None
See application file for complete search history.

(56) References Cited

U.S. PATENT DOCUMENTS

2017/0340769 A1* 11/2017 Dalal ......................... C09J 5/06
2018/0120196 A1 5/2018 Georgeson et al.
(Continued)

FOREIGN PATENT DOCUMENTS

JP A-2011-251560 12/2011
JP A-2016-011958 1/2016
(Continued)

OTHER PUBLICATIONS

F. Uehan, "Development of Remote Noncontact Evaluation Method of Railway Bridge Soundness," RTRI Report, vol. 32, No. 6, pp. 41-46 (2018) and English machine translation, 9 pages.
(Continued)

*Primary Examiner* — Suman K Nath
(74) *Attorney, Agent, or Firm* — Finnegan, Henderson, Farabow, Garrett & Dunner, LLP

(57) ABSTRACT

According to one embodiment, a sensor attachment/detachment device of the embodiment includes a sensor, a bonding member, a support portion, and a release execution portion. The bonding member is bonded to a first surface of the sensor and has a function of decreasing an adhesive force. The support portion can support the sensor by directly contacting a second surface of the sensor or via another functional portion. The release execution portion performs a process of releasing the bonding member from the object by decreasing the adhesive force of the bonding member after the sensor is attached to the object by the bonding member.

4 Claims, 11 Drawing Sheets

(56)  References Cited

U.S. PATENT DOCUMENTS

2018/0355216 A1* 12/2018 Ahn .......................... C09J 7/10
2021/0237867 A1    8/2021 Georgeson et al.

FOREIGN PATENT DOCUMENTS

JP      A-2018-105846        7/2018
JP      A-2021-122823        8/2021
JP          6941834 B2      9/2021

OTHER PUBLICATIONS

Japanese Patent Office, Office Action in JP Patent Application No.
2022-044948, 5 pages, with machine translation, 5 pages (Jul. 16,
2024).

* cited by examiner

100

30

10a — SENSOR ATTACHMENT/DETACHMENT DEVICE

20

REMOTE CONTROL DEVICE

10a

13

12

11

15

14

+Z

+Y

−X     +X

−Y

−Z

FIG. 6A
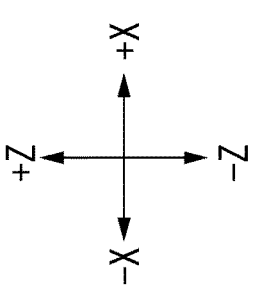
FIG. 6B
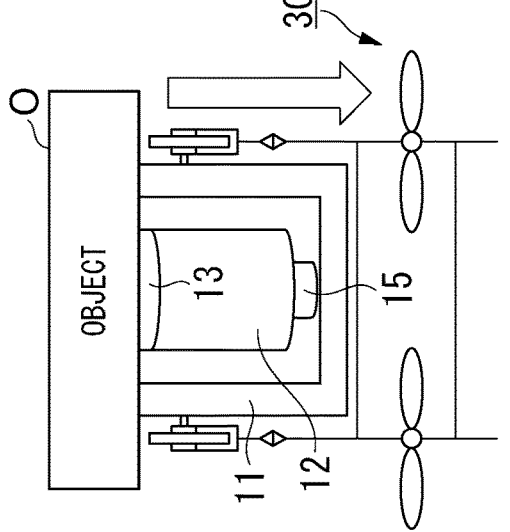
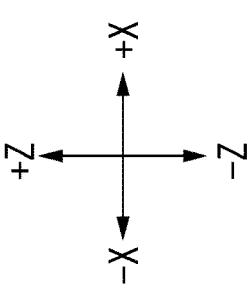
FIG. 6C
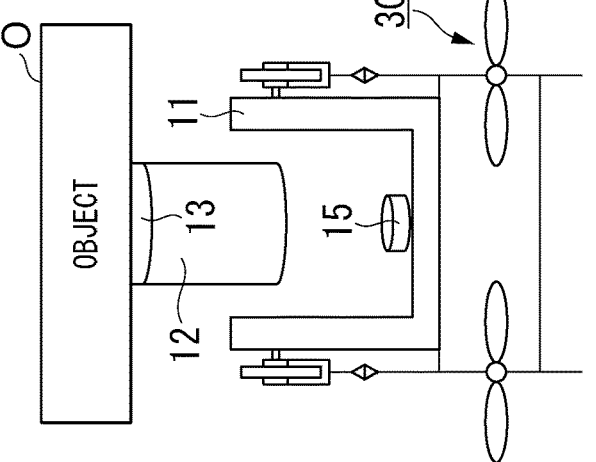

TRANSMITTING OF RELEASE SIGNAL

FIG. 9

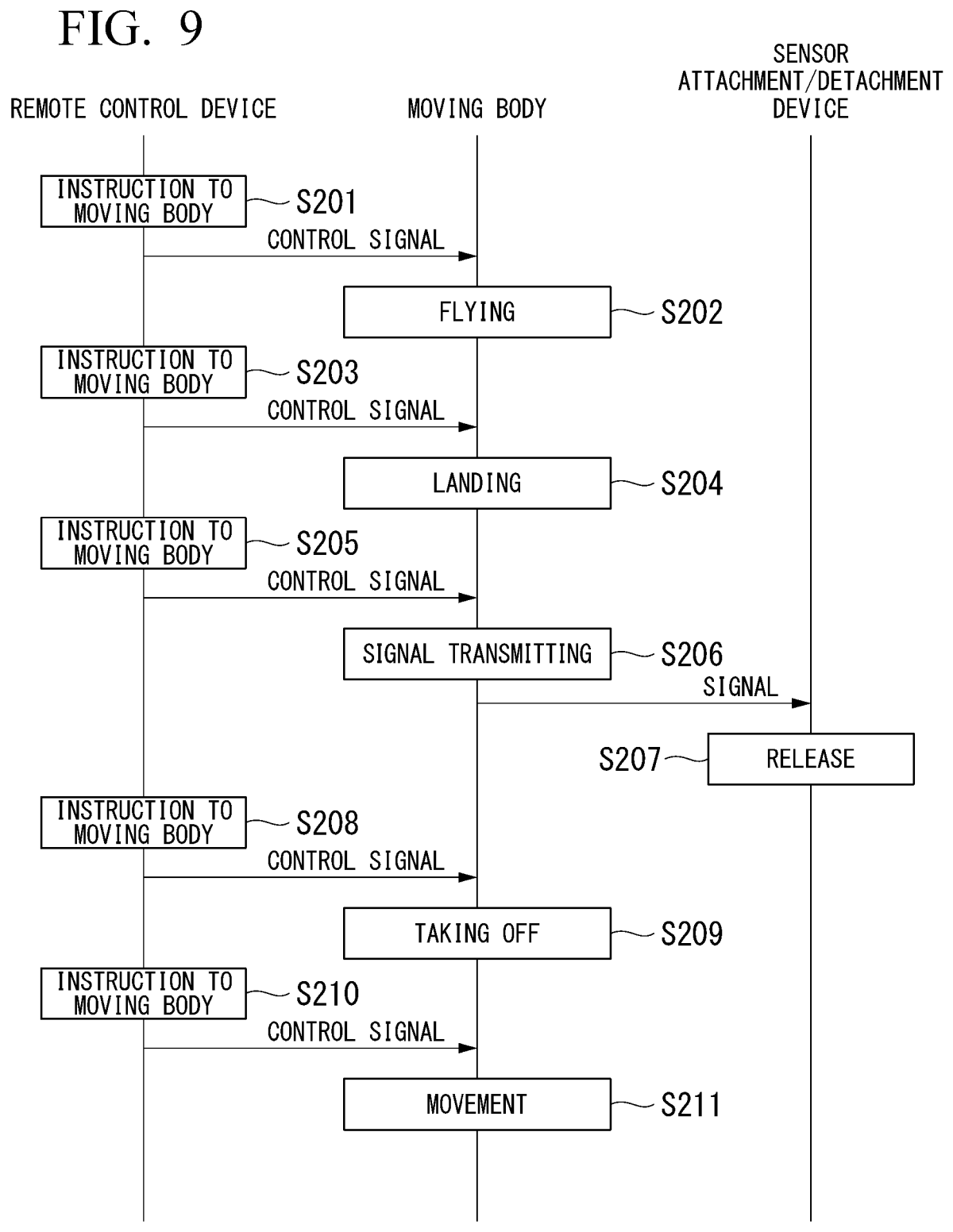

REMOTE CONTROL DEVICE MOVING BODY

SENSOR
ATTACHMENT/DETACHMENT
DEVICE

| INSTRUCTION TO MOVING BODY | S201

CONTROL SIGNAL

| FLYING | S202

| INSTRUCTION TO MOVING BODY | S203

CONTROL SIGNAL

| LANDING | S204

| INSTRUCTION TO MOVING BODY | S205

CONTROL SIGNAL

| SIGNAL TRANSMITTING | S206

SIGNAL

S207 | RELEASE

| INSTRUCTION TO MOVING BODY | S208

CONTROL SIGNAL

| TAKING OFF | S209

| INSTRUCTION TO MOVING BODY | S210

CONTROL SIGNAL

| MOVEMENT | S211

SENSOR ATTACHMENT/DETACHMENT DEVICE, SENSOR ATTACHMENT/DETACHMENT SYSTEM, SENSOR ATTACHMENT METHOD AND SENSOR DETACHMENT METHOD

CROSS-REFERENCE TO RELATED APPLICATION

This application is based upon and claims the benefit of priority from Japanese Patent Application No. 2022-044948, filed Mar. 22, 2022; the entire contents of which are incorporated herein by reference.

FIELD

Embodiments described herein relate generally to a sensor attachment/detachment device, a sensor attachment/detachment system, a sensor attachment method, and a sensor detachment method.

BACKGROUND

In order to evaluate the soundness of a structure such as a bridge, a method using a moving body such as a drone has been proposed. For example, a method of mounting an electromagnetic induction exploration probe on a moving body to evaluate the soundness of a structure or a method of mounting a vibration device and a microphone on a moving body to evaluate the soundness of a structure is proposed. By using such a method, the soundness of the structure can be evaluated by remotely controlling the moving body. As described above, although there is a method of evaluating the soundness of a structure by remote operation, the work of installing sensors for monitoring in structures is still done manually.

The amount of work required to install sensors in the structure increases with the number of sensors installed in the structure. Furthermore, since it is necessary to detach the installed sensor from the structure after the monitoring is completed, the amount of work to detach the sensor from the structure also increases according to the number of sensors installed in the structure. Conventionally, it may not be possible to easily attach or detach the sensor to or from the structure.

BRIEF DESCRIPTION OF THE DRAWINGS

FIG. 6A is a diagram showing an outline of a sensor bonding process which is performed by the moving body of the second embodiment.

FIG. 6B is a diagram showing an outline of a sensor bonding process which is performed by the moving body of the second embodiment.

FIG. 6C is a diagram showing an outline of a sensor bonding process which is performed by the moving body of the second embodiment.

FIG. 9 is a sequence diagram showing a sensor detachment process flow of the sensor attachment/detachment system of the second embodiment.

DETAILED DESCRIPTION

The present invention provides a problem to be solved by the present invention is to provide a sensor attachment/detachment device, a sensor attachment/detachment system, a sensor attachment method, and a sensor detachment method capable of easily attaching a sensor to an object which is an inspection object or detaching the sensor from the object.

According to one embodiment, a sensor attachment/detachment device of the embodiment includes a sensor, a bonding member, a support portion, and a release execution portion. The bonding member is bonded to a first surface of the sensor and has a function of decreasing an adhesive force. The support portion can support the sensor by directly contacting a second surface of the sensor or via another functional portion. The release execution portion performs a process of releasing the bonding member from the object by decreasing the adhesive force of the bonding member after the sensor is attached to the object by the bonding member.

Hereinafter, a sensor attachment/detachment device, a sensor attachment/detachment system, a sensor attachment method, and a sensor detachment method of the embodiment will be described with reference to the drawings.
(Outline)

A sensor attachment/detachment device of the embodiment is a device capable of easily supporting at least one of an operation of attaching a sensor to an object or an operation of detaching the sensor from the object. The sensor attachment/detachment device includes a sensor which is an attachment object provided inside a support portion supporting the sensor. A bonding member having a function of significantly decreasing an adhesive force by either electricity, heat, or light is bonded to a first surface of the sensor and the sensor can be easily attached to the object by bonding the sensor to the object using the bonding member.

The support portion is provided with a mechanism for decreasing the adhesive force of the bonding member. Since the adhesive force of the bonding member at the support portion is decreased, the bonding member can be easily released from the object and the sensor can be easily detached from the object.

In this embodiment, the sensor can be easily attached to the object which is an inspection object or the sensor can be easily detached from the object by the sensor attachment/detachment device with the above-described configuration.

Hereinafter, a detailed configuration will be described.

FIRST EMBODIMENT

Figure 1A:
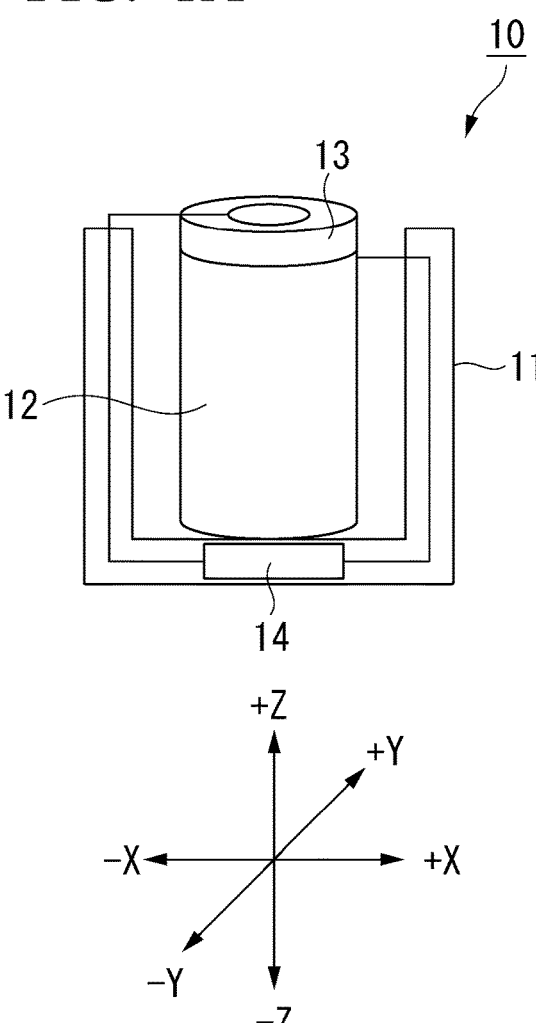
FIG. 1A is a diagram showing a front view of the sensor attachment/detachment device.
Figure 1B:
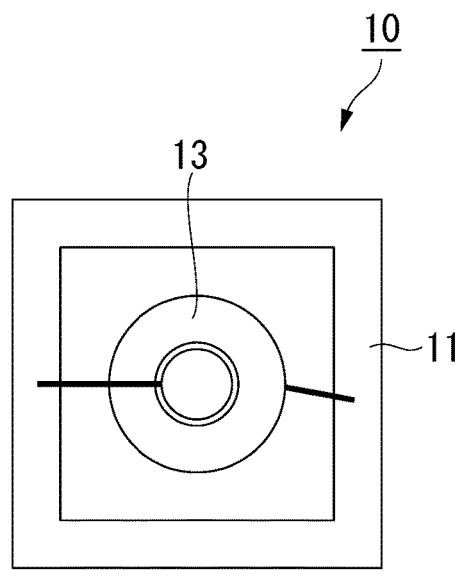
FIG. 1B is a diagram showing a plan view of the sensor attachment/detachment device.

FIGS. 1A and 1B are diagrams showing a configuration example of a sensor attachment/detachment device 10 of a first embodiment. FIG. 1A is a front view of the sensor attachment/detachment device 10 and FIG. 1B is a plan view of the sensor attachment/detachment device 10. The sensor attachment/detachment device 10 includes a support portion 11, a sensor 12, a bonding member 13, and a release execution portion 14. In the description below, the vertical direction is referred to as the Z direction, the first surface side of the sensor 12 provided in the sensor attachment/detachment device 10 is referred to as +Z, and the direction opposite to +Z is referred to as −Z. The first surface of the sensor 12 is a surface which is in contact with the object. In a horizontal plane perpendicular to the Z direction, the longitudinal direction of the sensor attachment/detachment device 10 is referred to as the X direction (left and right direction), one side is referred to as +X, and the other side is referred to as −X. Further, the lateral direction of the sensor attachment/detachment device 10 orthogonal to the X direction is referred to as the Y direction, one side is referred to as +Y, and the other side is referred to as −Y.

The support portion 11 is a member that is able to accommodate the sensor 12 therein and supports the sensor 12 therein. The support portion 11 is removed after the sensor 12 is bonded to the object. Therefore, it is preferable that the support portion 11 has a structure in which the sensor 12 can be installed therein and a hole capable of extracting the sensor 12 is provided. For example, as shown in FIGS. 1A and 1B, the support portion 11 may have a structure in which the support portion 11 has a box shape (in FIG. 1A, the description of a part of the side surface is omitted) and a part of the support portion 11 is opened (in FIG. 1A, the ceiling surface may be opened). When the support portion 11 has a configuration shown in FIGS. 1A and 1B, the support portion 11 includes a bottom portion, a left holding side wall, a right holding side wall, a front holding side wall, and a rear holding side wall.

The bottom portion is a bottom of the support portion 11. The bottom portion is provided at −Z of the sensor 12. The bottom portion is formed in a substantially plate shape on a horizontal plane along the X direction and the Y direction.

The left holding side wall is the −X side wall of the support portion 11. The left holding side wall is provided at −X of the sensor 12. The left holding side wall is formed in a substantially plate shape on a horizontal plane along the Z direction and the Y direction. The left holding side wall is erected at +Z in the Z direction from the −X end of the bottom portion.

The right holding side wall is the +X side wall of the support portion 11. The right holding side wall is provided at +X of the sensor 12. The right holding side wall is formed in a substantially plate shape on a horizontal plane along the Z direction and the Y direction. The right holding side wall is erected at +Z in the Z direction from the +X end of the bottom portion.

The front holding side wall is the −Y side wall of the support portion 11. The front holding side wall is provided at −Y of the sensor 12. The front holding side wall is formed in a substantially plate shape on a horizontal plane along the Z direction and the X direction. The front holding side wall is erected at +Z in the Z direction from the −Y end of the bottom portion.

The rear holding side wall is the +Y side wall of the support portion 11. The rear holding side wall is provided at +Y of the sensor 12. The rear holding side wall is formed in a substantially plate shape on a horizontal plane along the Z direction and the X direction. The rear holding side wall is erected at +Z in the Z direction from the +Y end of the bottom portion.

Additionally, the shape of the support portion 11 shown in FIGS. 1A and 1B are an example and the shape of the support portion 11 may be another shape. For example, the support portion 11 may have a substantially U shape having an opening at +7 when viewed from −Y in the Y direction. When the support portion 11 has a substantially U shape, the support portion 11 includes the bottom portion, the left holding side wall, and the right holding side wall.

The object is an inspection object, for example, a structure. The structure is, for example, a bridge made of concrete. The structure is not limited to a bridge, but may be any structure in which elastic waves are generated due to the generation or growth of cracks or external impact (for example, rain, artificial rain, etc.) or any structure as long as the vibration of the structure itself changes due to damage. For example, the structure may be bedrock. The bridge is not limited to a structure erected on a river or a valley, but also includes various structures (for example, a highway bridge) provided above the ground.

The sensor 12 is attached to the object and detects an elastic wave generated from the inside of the object or vibration of the object. The sensor 12 is, for example, an acoustic emission (AE) sensor. The sensor 12 is installed at a position in which an elastic wave can be detected. For example, the sensor 12 is installed on a surface different from the surface on which a load is applied to the object. When the surface on which the load is applied is the road surface of the object, the sensor 12 is installed on either the side surface or the bottom surface of the object.

The sensor 12 is not limited to the AE sensor and may be another sensor. For example, the sensor 12 may be an acceleration sensor. The bonding member 13 is bonded to the first surface of the sensor 12. The second surface of the sensor 12 is in contact with the bottom surface of the support portion 11.

The bonding member 13 is bonded to the first surface of the sensor 12 so that the sensor 12 adheres to the object by a predetermined adhesive force. For example, the bonding member 13 protrudes only by an arbitrary amount to +Z in the Z direction from the support portion 11 while not contacting the object. The bonding member 13 is a member having a function of significantly decreasing the adhesive force by the action of either electricity, heat, or light. The bonding member 13 is, for example, an electrically peelable adhesive, a thermally peelable adhesive, or an optically peelable adhesive. The electrically peelable adhesive is an adhesive whose adhesive force is significantly decreased by a voltage. In the electrically peelable adhesive, the adhesive force is decreased to 1/10 or less in a short time (about several tens of seconds) by the action of a voltage, and the sensor 12 can be easily recovered. The thermally peelable adhesive is an adhesive whose adhesive force is significantly decreased by heat. In the thermally peelable adhesive, the adhesive force is decreased in a short time by the action of heat (for example, heating) and the sensor 12 can be easily recovered. The optically peelable adhesive is an adhesive whose adhesive force is significantly decreased by optical rays such as ultraviolet rays. In the optically peelable adhesive, the adhesive force is decreased in a short time by the action of optical rays (irradiation with optical rays such as ultraviolet rays) and the sensor 12 can be easily recovered.

When the bonding member 13 is an electrically peelable adhesive, the bonding member 13 includes an electrically peelable adhesive and an electrode. The electrically peelable adhesive is provided between a first electrode and a second electrode of the electrode. The first electrode and the second electrode are bonded to the electrically peelable adhesive by an adhesive (not shown). The electrode is a sheet of a non-adhesive object having conductivity. Examples of the non-adhesive object having conductivity include metals such as aluminum, tin-doped indium oxide, copper, iron, silver, platinum, and gold, and alloys of these metals. The electrode includes a first electrode and a second electrode. Additionally, the electrode has conductivity at least in a portion that contacts the electrically peelable adhesive and a portion that contacts each terminal of the electric wire extending from the release execution portion 14 and these portions may be in a conductive state. A plurality of electrodes may be provided.

The first electrode is provided on, for example, the first surface of the electrically peelable adhesive. The first surface of the electrically peelable adhesive is a surface which is in contact with the object. The second electrode is provided, for example, between the second surface of the electrically peelable adhesive and the first surface of the sensor 12. The second surface of the electrically peelable adhesive is a surface on the side opposite to the first surface of the electrically peelable adhesive. The first electrode, the electrically peelable adhesive, and the second electrode are arranged to overlap in this order from +Z to −Z in the Z direction.

When a voltage is applied to the first electrode and the second electrode of the bonding member 13, a current flows through the electrically peelable adhesive. Accordingly, the adhesive force of the electrically peelable adhesive gradually decreases and the tape is released from the object.

The release execution portion 14 performs a process of releasing the bonding member 13 from the object by decreasing the adhesive force of the bonding member 13. Specifically, the release execution portion 14 releases the bonding member 13 from the object by decreasing the adhesive force of the bonding member 13 by the action of either electricity, heat, or light. In this way, the release execution portion 14 performs a process of decreasing the adhesive force of the bonding member 13. For example, the release execution portion 14 has a function of energizing the electrically peelable adhesive by applying a voltage to the first electrode and the second electrode in order to decrease the adhesive force of the electrically peelable adhesive when the bonding member 13 is the electrically peelable adhesive.

For example, the release execution portion 14 has a function of heating the thermally peelable adhesive in order to decrease the adhesive force of the thermally peelable adhesive when the bonding member 13 is the thermally peelable adhesive. For example, the release execution portion 14 has a function of irradiating the optically peelable adhesive with ultraviolet rays in order to decrease the adhesive force of the optically peelable adhesive when the bonding member 13 is the optically peelable adhesive.

FIG. 1A shows a configuration in which the bonding member 13 is the electrically peelable adhesive and the release execution portion 14 energizes the electrically peelable adhesive via an electric wire (for example, an anode electrode (first electrode) is provided on the first surface of the electrically peelable adhesive and a cathode electrode (second electrode) is provided on the second surface thereof). In FIG. 1A, either the first surface or the second surface of the electrically peelable adhesive is hidden at the interface between the sensor 12 and the bonding member 13. Additionally, when the sensor 12 is attached to the object, it is necessary to cut the electric wire extending from the release execution portion 14 to each electrode. Here, it is preferable that the electric wire extending from the release execution portion 14 and each electrode have a configuration in which the electric wire and each electrode can be connected and disconnected by a connector.

When the release execution portion 14 energizes the electrically peelable adhesive via an electric wire by hand, the release execution portion 14 may be provided with a switch to apply a voltage in a switch on state or a switch off state. It is determined that the release execution portion 14 applies a voltage when the switch is turned on and the release execution portion 14 does not apply a voltage when the switch is turned off. For example, the release execution portion 14 applies a voltage to each electrode via the electric wire when the switch is turned on and the electric wire is connected to each electrode. Hereinafter, a case in which the bonding member 13 is an electrically peelable adhesive will be described as an example.

Next, an operation of the first embodiment will be described. First, a sensor attachment process of the first embodiment will be described. In the first embodiment, a user brings the sensor attachment/detachment device 10 to the object and attaches the sensor 12 to the object. Specifically, first, the user presses the sensor attachment/detachment device 10 against the object so that the bonding member 13 is bonded to the object. For example, the user presses the sensor attachment/detachment device 10 against the object with a pressure at which the bonding member 13 is bonded to the object at +Z in the Z direction. Next, the user pulls the support portion 11 of the sensor attachment/detachment device 10 in the opposite direction (for example, −Z in the Z direction) after confirming that the bonding member 13 is bonded to the object. If the bonding member 13 is bonded to the object, the sensor 12 bonded to the bonding member 13 is also bonded to the object. Therefore, the sensor 12 can be taken out from the support portion 11 and the sensor 12 can be attached to the object.

Figures 2A, 2B, 2C:
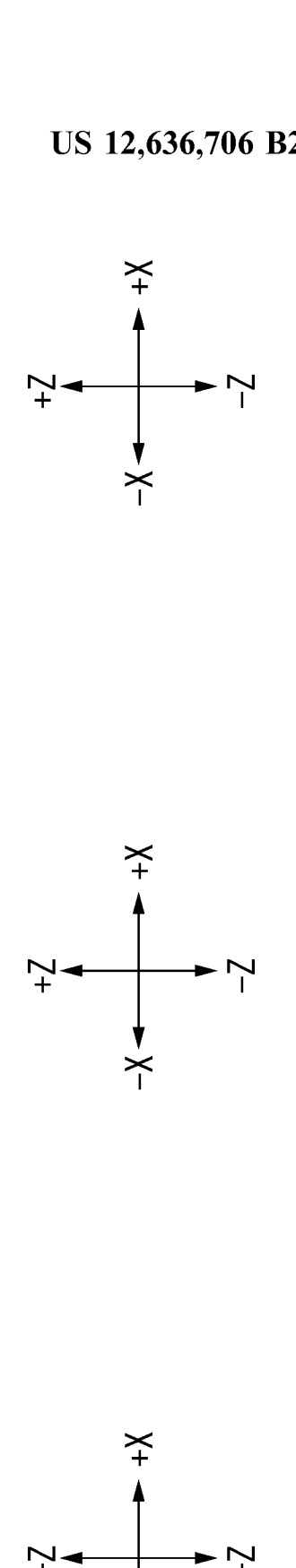
FIG. 2A is a diagram showing an outline of a sensor detachment process of the first embodiment.
FIG. 2B is a diagram showing an outline of a sensor detachment process of the first embodiment.
FIG. 2C is a diagram showing an outline of a sensor detachment process of the first embodiment.

Next, a sensor detachment process of the first embodiment will be described. FIGS. 2A to 2C are diagrams showing an outline of the sensor detachment process of the first embodiment. First, the user moves the support portion 11 of the sensor attachment/detachment device 10 to +Z in the Z direction to cover the sensor 12 to be detached as shown in FIG. 2A. At this time, the user connects the electric wire extending from the release execution portion 14 of the sensor attachment/detachment device 10 to each electrode of the bonding member 13 via a connector. Next, the user operates the release execution portion 14 (for example, turns on the switch) to decrease the adhesive force of the bonding member 13 (FIG. 2B). A decrease degree of the adhesive force of the bonding member 13 for a certain period is obtained in advance by an experiment or the like.

Then, the user detaches the sensor 12 by pulling the support portion 11 of the sensor attachment/detachment device 10 to −Z in the Z direction at a timing in which the adhesive force of the bonding member 13 is decreased (FIG. 2C). When the adhesive force of the bonding member 13 decreases, a case is also assumed in which the sensor 12 falls into the support portion 11 due to the own weight. However, there is a case in which the sensor 12 is bonded to the object O even when the adhesive force of the bonding member 13 decreases. In such a case, the user may detach the sensor 12 from the object O by alternately shaking the support portion 11 in the +X direction and the −X direction. Additionally, in this embodiment, the procedure is such that the support portion 11 of the sensor attachment/detachment device 10 is detached from the sensor 12 when the sensor 12 is attached to the object. However, when the weight of the support portion 11 is sufficiently smaller than the adhesive force of the bonding member 13 to the object, the procedure in which the support portion 11 is detached from the sensor 12 may be omitted. That is, the support portion 11 may be left attached to the sensor 12 in the measurement of the object. In this case, the procedure of FIG. 2A in the detachment process is omitted.

According to the sensor attachment/detachment device 10 with the above-described configuration, the sensor 12 is attached to the object O by the bonding member 13 having a function of largely decreasing the adhesive force. Accordingly, the bonding member 13 is released from the object O by performing a process of decreasing the adhesive force of the bonding member 13 after the inspection of the object O is completed. Since the sensor 12 is bonded to the bonding member 13, the sensor 12 can be also released when the bonding member 13 is released from the object O. Therefore, the sensor 12 can be easily detached from the object O.

Further, a member having a function of largely decreasing the adhesive force by either electricity, heat, or light is used as the bonding member 13 of the sensor attachment/detachment device 10. Therefore, the sensor 12 can be easily detached from the object O by the action of either electricity, heat, or light.

Further, the sensor attachment/detachment device 10 can be used repeatedly only by replacing the adhesive (for example, electrically peelable adhesive, thermally peelable adhesive, optically peelable adhesive) in the bonding member 13. Therefore, stable sensor installation work can be performed at low cost.

SECOND EMBODIMENT

In the first embodiment, a configuration in which the user attaches or detaches the sensor to or from the object is shown. In the second embodiment, a configuration will be described in which the sensor is attached to and detached from the object by a moving body such as a drone.

Figure 3:
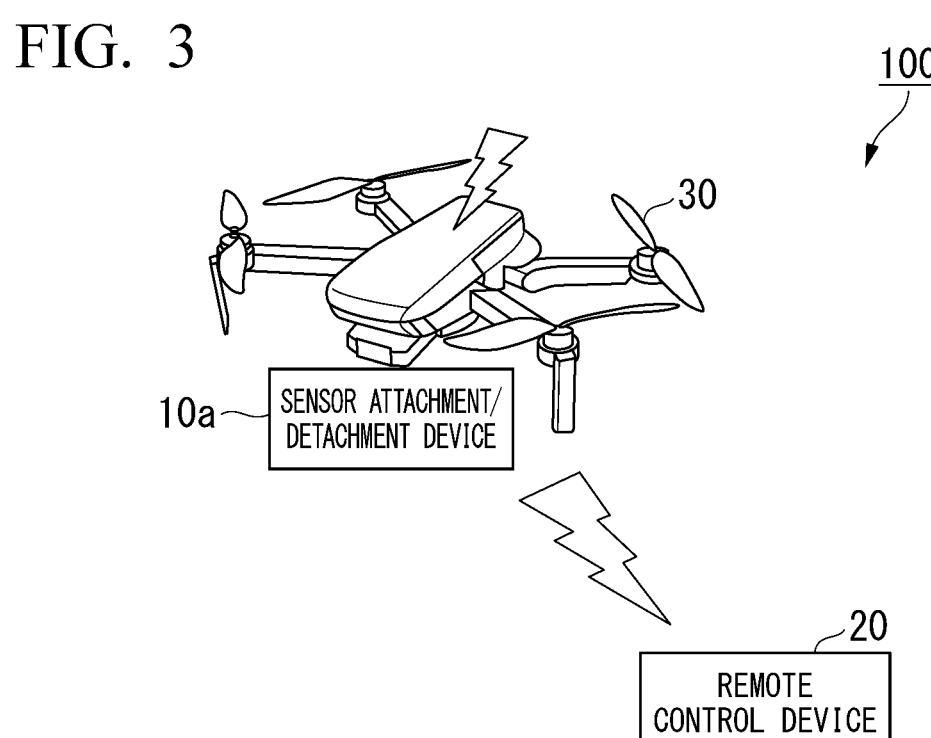
FIG. 3 is a diagram showing a system configuration of a sensor attachment/detachment system of a second embodiment.

FIG. 3 is a diagram showing a system configuration of a sensor attachment/detachment system 100 of the second embodiment. The sensor attachment/detachment system 100 is a system which performs at least one of the attachment of the sensor 12 to the object O and the detachment of the sensor 12 from the object O. The sensor attachment/detachment system 100 includes a sensor attachment/detachment device 10a, a remote control device 20, and a moving body 30. The sensor attachment/detachment device 10a is held by the moving body 30 and is moved to the object. FIG. 3 shows a configuration in which the sensor attachment/detachment device 10a is held below the moving body 30, but the sensor attachment/detachment device 10a may be held above the moving body 30.

The sensor attachment/detachment device 10a basically has the same configuration as that of the first embodiment. However, it is preferable that the sensor 12 is fixed to the support portion 11 since the sensor is carried while flying by the moving body. Here, the sensor attachment/detachment device 10a may have a configuration shown in FIG. 4.

Figure 4:
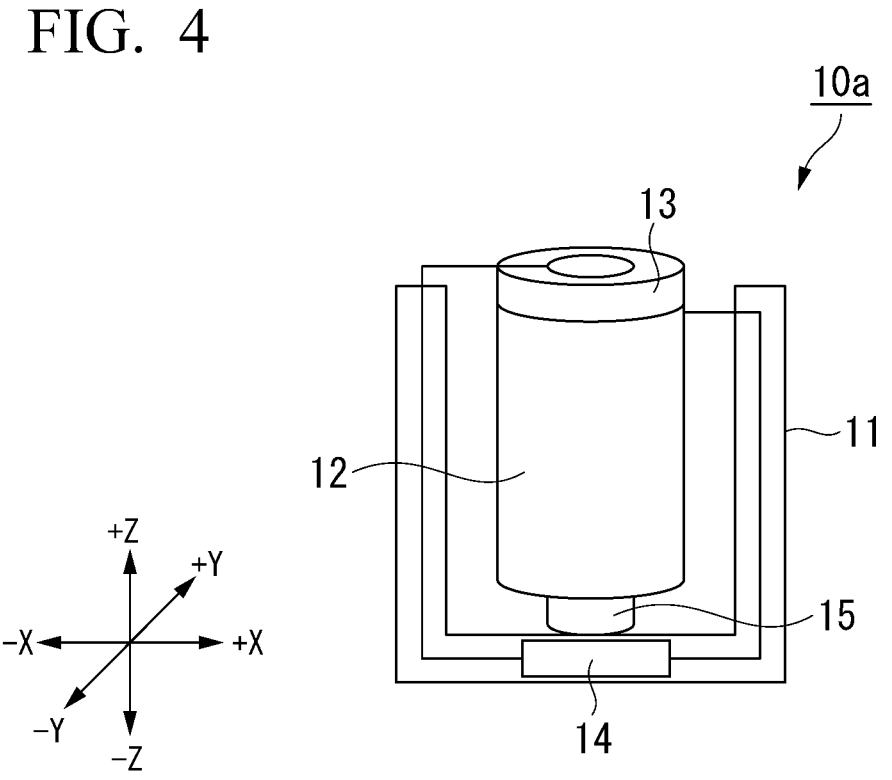
FIG. 4 is a diagram showing a configuration example of the sensor attachment/detachment device of the second embodiment.

FIG. 4 is a diagram showing a configuration example of the sensor attachment/detachment device 10a of the second embodiment. The sensor attachment/detachment device 10a includes a support portion 11, a sensor 12, a bonding member 13, a release execution portion 14, and an adhesive portion 15. The configuration of the sensor attachment/detachment device 10a is different from that of the sensor attachment/detachment device 10 in that the adhesive portion 15 is further provided. The other configurations of the sensor attachment/detachment device 10a are the same as those of the sensor attachment/detachment device 10. Here, the configuration of the adhesive portion 15 will be described.

The adhesive portion 15 is a member for fixing the sensor 12 to the support portion 11. The adhesive portion 15 is provided between the sensor 12 and the adhesive portion 15. The adhesive force of the adhesive portion 15 is smaller than the bonding force of the bonding member 13 with respect to the object O. This is for releasing the adhesive portion 15 from the sensor 12 before the bonding member 13 is released from the object O by pulling the support portion 11 when attaching the sensor 12 to the object O.

A description will be continued by returning to FIG. 3.

The remote control device 20 is a device for wirelessly operating the moving body 30.

The moving body 30 is an object which moves while flying according to the instruction of the remote control device 20. The moving body 30 is, for example, a drone. The moving body 30 is externally provided with a holding portion (for example, an arm) for holding the sensor attachment/detachment device 10a, a plurality of propellers, and a plurality of wheels.

The following two issues are assumed as issues when attaching and detaching the sensor with the moving body 30.

First issue: confirmation of adhesive force of sensor 12 to object O

Second issue: easy and reliable detachment of sensor 12

When the sensor 12 is manually attached, the adhesive force of the sensor 12 to the object O can be confirmed by the force increased and decreased by the user. However, there is a case in which a desired adhesive force cannot be expected when the sensor 12 is attached to the object O by the moving body 30. Here, the first issue is solved by managing the adhesive force between the bonding member 13 and the adhesive portion 15. That is, when the required specification of the adhesive force between the object O and the sensor 12 is xN, the adhesive force between the adhesive portion 15 and the sensor 12 is managed as xN while using a member that is expected to have an adhesive force exceeding xN to the object O as the bonding member 13. The moving body 30 bonds the sensor 12 to the object O while pressing the bonding member 13 against the object O at xN or more which is a thrust in the attachment direction of the sensor 12 (sensor attachment direction) and the moving body 30 pulls the sensor attachment/detachment device 10a at xN or more which is a thrust in the direction opposite to the sensor attachment direction after the attachment operation is completed. When the bonding member 13 is attached to the object O by the adhesive force exceeding a desired xN, the adhesive portion 15 is released first and only the sensor 12 and the bonding member 13 are left attached to the object O. That is, the support portion 11 and the adhesive portion 15 are detached.

The second issue is solved by using the bonding member 13 of which the adhesive force suddenly decreases similarly to the first embodiment.

Hereinafter, a detailed configuration will be described.

Figure 5:
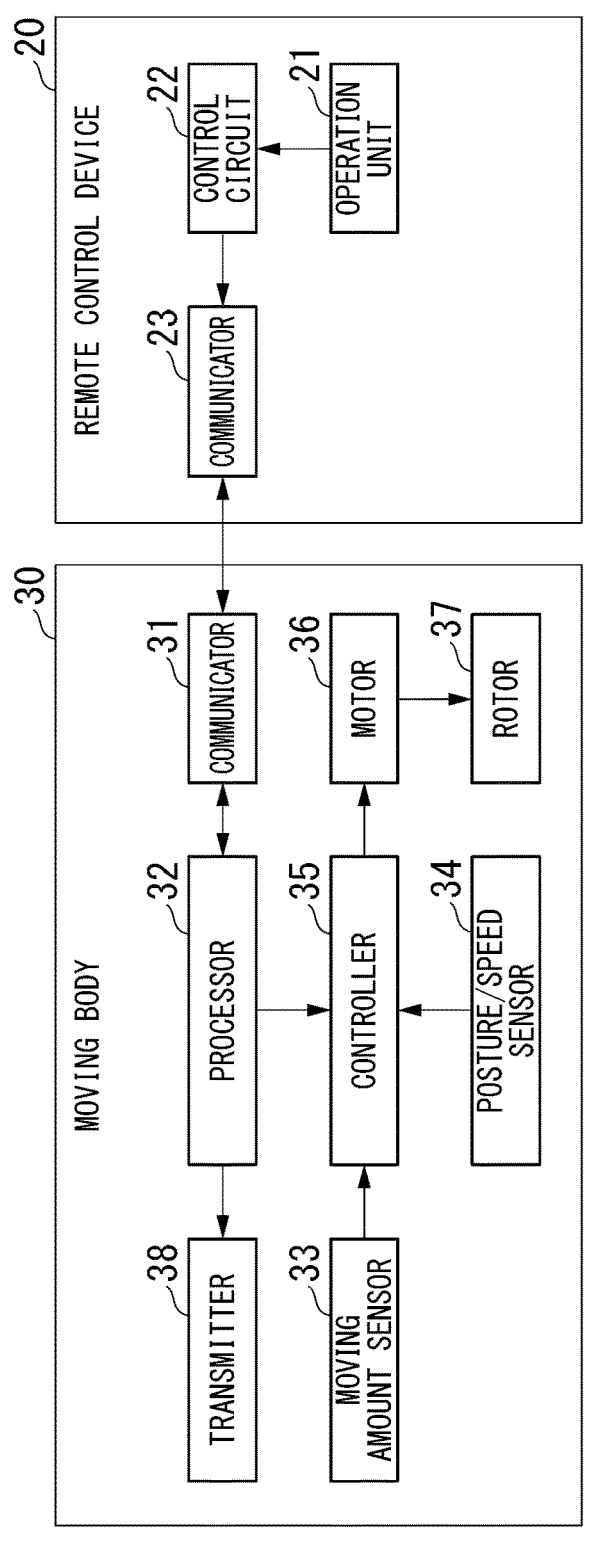
FIG. 5 is a diagram showing a configuration example of a remote control device and a moving body of the second embodiment.

FIG. 5 is a diagram showing a configuration example of the remote control device 20 and the moving body 30 of the second embodiment. First, the configuration of the remote control device 20 will be described. The remote control device 20 includes an operation unit 21, a control circuit 22, and a communicator 23.

The operation unit 21 receives an input of an instruction of the user. The operation unit 21 outputs the instruction input by the user to the control circuit 22. The instruction of the user is, for example, the movement instruction related to the movement of the moving body 30, the attachment instruction of the sensor 12, and the detachment instruction of the sensor 12.

The control circuit 22 outputs a control signal corresponding to the user's instruction output from the operation unit 21 to the communicator 23.

The communicator 23 wirelessly transmits the control signal output from the control circuit 22 to the moving body 30.

Next, the configuration of the moving body 30 will be described. The moving body 30 includes a communicator 31, a processor 32, a moving amount sensor 33, a posture/speed sensor 34, a controller 35, a motor 36, a rotor 37, and a transmitter 38.

The communicator 31 receives the control signal transmitted from the remote control device 20.

The processor 32 controls the operation of the moving body 30 in response to the control signal received by the communicator 31. When the control signal is a movement instruction, the processor 32 instructs the controller 35 to move the moving body 30. When the control signal is an attachment instruction, the processor 32 instructs the controller 35 to perform the sensor attachment process. When the control signal is a detachment instruction, the processor 32 instructs the transmitter 38 to transmit a signal from the transmitter 38 to the sensor attachment/detachment device 10a.

The moving amount sensor 33 is a sensor which measures the movement amount of the moving body 30.

The posture/speed sensor 34 is a sensor which measures the posture (inclination angle and direction) and acceleration of the moving body 30. The posture/speed sensor 34 is, for example, a gyro sensor or an acceleration sensor.

The controller 35 rotationally drives the motor 36 in order to move the moving body 30 at least on the basis of the instruction of the processor 32. Further, the controller 35 grasps the inclination of the moving body 30 on the basis of the information of the acceleration or the information of the posture (inclination angle and direction) of the moving body 30 measured by the posture/speed sensor 34. When there is a change in the inclination of the moving body 30, the controller 35 adjusts the rotation speed of the motor 36 to have a correct posture (inclination).

The motor 36 is rotationally driven to give power to the rotor 37. The motor 36 is provided as many as, for example, the rotor 37 provided in the moving body 30.

The rotor 37 rotates each propeller by the power obtained from the motor 36. The rotor 37 is provided as many as, for example, the propeller provided in the moving body 30.

The transmitter 38 transmits a signal including a detachment instruction to the sensor attachment/detachment device 10a.

FIGS. 6A to 6C are diagrams showing an outline of the sensor bonding process which is performed by the moving body 30 of the second embodiment.

First, the user operates the remote control device 20 and moves the moving body 30 holding the sensor attachment/detachment device 10a to the position of the object O. The user operates the remote control device 20 and lands the moving body 30 on the surface of the object O which is the installation object in the sensor 12. Additionally, the user moves the moving body 30 to a target place by moving on the surface of the object O if necessary. If the moving body 30 is moved to the target place, the user operates the remote control device 20 and controls the moving body 30 so that the bonding member 13 is pressed against the object O at a force in which the moving body 30 has a +Z-direction thrust in the Z direction exceeding xN (FIG. 6A). Accordingly, the sensor 12 is bonded to the object O.

Next, the user operates the remote control device 20 and controls the moving body 30 so that the moving body 30 pulls the sensor attachment/detachment device 10a at a force of xN or more which is a −Z-direction thrust in the Z direction (FIG. 6B). As described above, when the bonding member 13 is attached to the object O at an adhesive force exceeding xN, as shown in FIG. 6C, the adhesive portion 15 is first released and only the sensor 12 and the bonding member 13 are left attached to the object O. Then, the user can install the sensor 12 again by operating the remote control device 20, returning the moving body 30 to the position of the user, and installing a new sensor 12 in the sensor attachment/detachment device 10a.

Figure 7A:
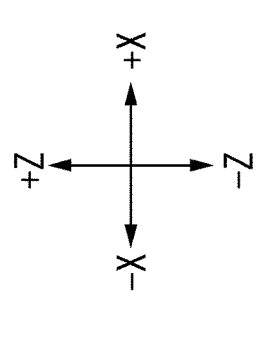
FIG. 7A is a diagram showing an outline of the sensor detachment process which is performed by the moving body of the second embodiment.
Figure 7B:
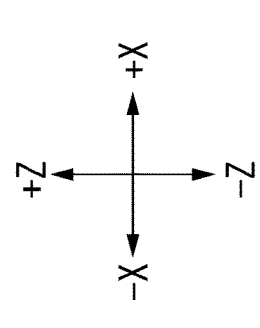
FIG. 7B is a diagram showing an outline of the sensor detachment process which is performed by the moving body of the second embodiment.
Figure 7C:
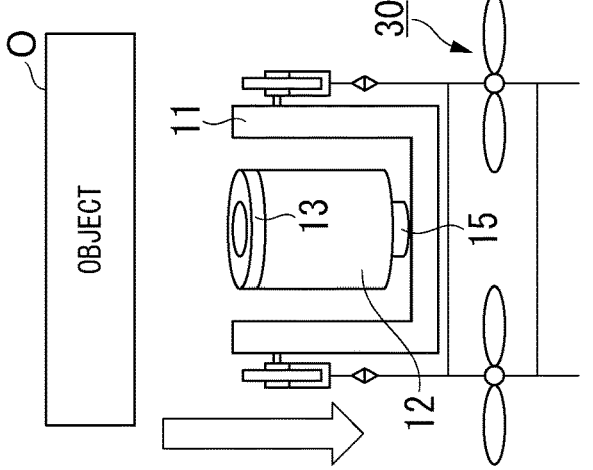
FIG. 7C is a diagram showing an outline of the sensor detachment process which is performed by the moving body of the second embodiment.

FIGS. 7A to 7C are diagrams showing an outline of the sensor detachment process which is performed by the moving body 30 of the second embodiment.

First, the user operates the remote control device 20 and moves the moving body 30 holding the sensor attachment/detachment device 10a (the sensor attachment/detachment device 10a including the support portion 11, the release execution portion 14, and the adhesive portion 15) not provided with the sensor 12 to the position of the object O. Next, the user operates the remote control device 20 and moves the moving body 30 to the installation place of the sensor 12. The user operates the remote control device 20 and moves the moving body 30 to +Z in the Z direction to cover the sensor 12 to be detached as shown in FIG. 7A. Accordingly, the sensor 12 is accommodated in the support portion 11.

Next, the user operates the remote control device 20 and transmits a signal for performing a process of decreasing the adhesive force of the bonding member 13 from the moving body 30 to the release execution portion 14. The release execution portion 14 decreases the adhesive force of the bonding member 13 in response to a signal obtained from the moving body 30 (FIG. 7B). Then, the user operates the remote control device 20, moves the moving body 30 to −Z in the Z direction, and pulls the support portion 11 of the sensor attachment/detachment device 10a to detach the sensor 12 at a timing in which the adhesive force of the bonding member 13 decreases (FIG. 7C). As shown in FIG.

7A, the moving body 30 is moved to +Z in the Z direction so that the adhesive portion 15 and the sensor 12 are bonded. Therefore, the moving body 30 is moved to −Z in the Z direction and the support portion 11 of the sensor attachment/detachment device 10*a* is pulled so that the sensor 12 can be easily detached. Then, the user can detach another sensor 12 again by performing a process shown in FIGS. 7A to 7C after operating the remote control device 20, returning the moving body 30 to the position of the user, and collecting the sensor 12 accommodated in the sensor attachment/detachment device 10*a*.

Figure 8:
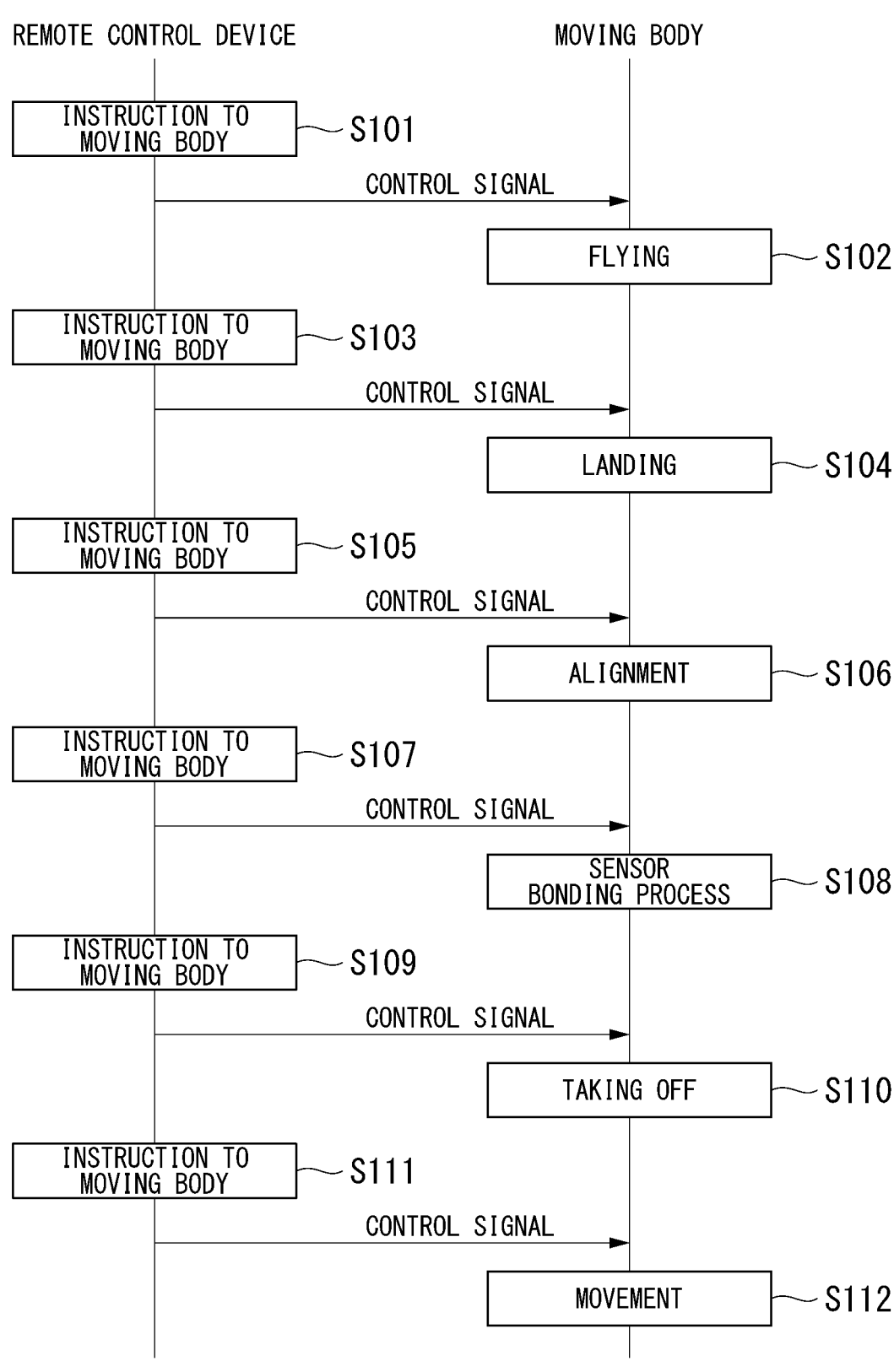
FIG. 8 is a sequence diagram showing a sensor bonding process flow of the sensor attachment/detachment system of the second embodiment.

FIG. 8 is a sequence diagram showing a sensor bonding process flow of the sensor attachment/detachment system 100 of the second embodiment.

The user operates the operation unit 21 of the remote control device 20 and inputs an instruction for taking off the moving body 30 holding the sensor attachment/detachment device 10*a* to the remote control device 20. The control circuit 22 of the remote control device 20 transmits a control signal including the movement instruction for taking off the moving body 30 to the moving body 30 via the communicator 23 in response to the input instruction (step S101).

The communicator 31 of the moving body 30 receives the control signal transmitted from the remote control device 20. The communicator 31 outputs the received control signal to the processor 32. Since the control signal received by the communicator 31 is an instruction related to a movement instruction, the processor 32 instructs the controller 35 to move the moving body 30. The controller 35 rotationally drives the motor 36 and gives power to the rotor 37 so that the moving body 30 flies (step S102). The user operates the remote control device 20 and moves the moving body 30 holding the sensor attachment/detachment device 10*a* to the position of the object O.

Next, if the moving body 30 is moved to the position of the object O, the user operates the operation unit 21 of the remote control device 20 and inputs an instruction for landing the moving body 30 holding the sensor attachment/detachment device 10*a* to the remote control device 20. The control circuit 22 of the remote control device 20 transmits a control signal including the movement instruction for landing the moving body 30 to the moving body 30 via the communicator 23 in response to the input instruction (step S103).

The communicator 31 of the moving body 30 receives the control signal transmitted from the remote control device 20. The communicator 31 outputs the received control signal to the processor 32. Since the control signal received by the communicator 31 is an instruction related to a movement instruction, the processor 32 instructs the controller 35 to land the moving body 30. The controller 35 controls the rotation of the motor 36 and gives power to the rotor 37 so that the moving body 30 is landed on the surface of the object O (step S104).

Next, if the moving body 30 is landed on the surface of the object O, the user operates the operation unit 21 of the remote control device 20 and inputs an instruction for moving the moving body 30 holding the sensor attachment/detachment device 10*a* to a place to install the sensor 12 to the remote control device 20. The control circuit 22 of the remote control device 20 transmits a control signal including the movement instruction for moving the moving body 30 to a place to install the sensor 12 to the moving body 30 via the communicator 23 in response to the input instruction (step S105).

The communicator 31 of the moving body 30 receives the control signal transmitted from the remote control device 20.

The communicator 31 outputs the received control signal to the processor 32. Since the control signal received by the communicator 31 is an instruction related to a movement instruction, the processor 32 instructs the controller 35 to move the moving body 30 to the surface of the object O for the alignment (step S106).

Next, if the moving body 30 moves to a place to install the sensor 12, the user operates the operation unit 21 of the remote control device 20 and inputs an attachment instruction to the remote control device 20. The control circuit 22 of the remote control device 20 transmits a control signal including an attachment instruction with respect to the moving body 30 holding the sensor attachment/detachment device 10*a* to the moving body 30 via the communicator 23 in response to the input instruction (step S107).

The communicator 31 of the moving body 30 receives the control signal transmitted from the remote control device 20. The communicator 31 outputs the received control signal to the processor 32. Since the control signal received by the communicator 31 is an attachment instruction, the processor 32 instructs the controller 35 to perform a process of bonding the sensor 12. For example, the controller 35 controls the rotation speed of the motor 36 so that the moving body 30 has a +Z-direction thrust in the Z direction exceeding xN and gives power to the rotor 37 to perform a process of bonding the sensor 12 (step S108).

The user operates the operation unit 21 of the remote control device 20 and inputs an instruction for taking off the moving body 30 to the remote control device 20 at a timing in which the sensor 12 seems to be bonded to the object O. The control circuit 22 of the remote control device 20 transmits a control signal including the movement instruction for taking off the moving body 30 to the moving body 30 via the communicator 23 in response to the input instruction (step S109).

The communicator 31 of the moving body 30 receives the control signal transmitted from the remote control device 20. The communicator 31 outputs the received control signal to the processor 32. Since the control signal received by the communicator 31 is an instruction related to a movement instruction, the processor 32 instructs the controller 35 to move the moving body 30. The controller 35 rotationally drives the motor 36 and gives power to the rotor 37 so that the moving body 30 takes off (step S110).

Next, the user operates the operation unit 21 of the remote control device 20 and inputs an instruction for moving the moving body 30 to the remote control device 20. The control circuit 22 of the remote control device 20 transmits a control signal including the movement instruction for moving the moving body 30 to the moving body 30 via the communicator 23 in response to the input instruction (step S111).

The communicator 31 of the moving body 30 receives the control signal transmitted from the remote control device 20. The communicator 31 outputs the received control signal to the processor 32. Since the control signal received by the communicator 31 is an instruction related to a movement instruction, the processor 32 instructs the controller 35 to land the moving body 30. The controller 35 controls the rotation of the motor 36 and gives power to the rotor 37 to rotate a plurality of propellers so that the moving body 30 is moved (step S112).

FIG. 9 is a sequence diagram showing a sensor detachment process flow of the sensor attachment/detachment system 100 of the second embodiment. When the process of FIG. 9 starts, it is assumed that the sensor 12 is not installed in the sensor attachment/detachment device 10*a* held by the moving body 30.

The user operates the operation unit 21 of the remote control device 20 and inputs an instruction for taking off the moving body 30 holding the sensor attachment/detachment device 10*a* (the sensor attachment/detachment device 10*a* including the support portion 11, the release execution portion 14, and the adhesive portion 15) not provided with the sensor 12 to the remote control device 20. The control circuit 22 of the remote control device 20 transmits a control signal including the movement instruction for taking off the moving body 30 to the moving body 30 via the communicator 23 in response to the input instruction (step S201).

The communicator 31 of the moving body 30 receives the control signal transmitted from the remote control device 20. The communicator 31 outputs the received control signal to the processor 32. Since the control signal received by the communicator 31 is an instruction related to a movement instruction, the processor 32 instructs the controller 35 to move the moving body 30. The controller 35 rotationally drives the motor 36 and gives power to the rotor 37 so that the moving body 30 flies (step S202). The user operates the remote control device 20 and moves the moving body 30 to an installation place of the sensor 12.

Next, if the moving body 30 is moved to the installation place of the sensor 12, the user operates the operation unit 21 of the remote control device 20 and inputs an instruction for landing the moving body 30 to the remote control device 20. The control circuit 22 of the remote control device 20 transmits a control signal including the movement instruction for landing the moving body 30 to the moving body 30 via the communicator 23 in response to the input instruction (step S203).

The communicator 31 of the moving body 30 receives the control signal transmitted from the remote control device 20. The communicator 31 outputs the received control signal to the processor 32. Since the control signal received by the communicator 31 is an instruction related to a movement instruction, the processor 32 instructs the controller 35 to land the moving body 30. The controller 35 controls the rotation of the motor 36 and gives power to the rotor 37 so that the moving body 30 is landed on the surface of the object O (step S204).

Since the moving body 30 moves in the air above the installation surface of the sensor 12, the support portion 11 covers the sensor 12 installed on the object O if the moving body 30 is landed on the surface of the object O.

Next, if the moving body 30 is landed on the surface of the object O, the user operates the operation unit 21 of the remote control device 20 and inputs a detachment instruction to the remote control device 20. The control circuit 22 of the remote control device 20 transmits a control signal including the detachment instruction for the sensor 12 with respect to the moving body 30 to the moving body 30 via the communicator 23 in response to the input instruction (step S205).

The communicator 31 of the moving body 30 receives the control signal transmitted from the remote control device 20. The communicator 31 outputs the received control signal to the processor 32. Since the control signal received by the communicator 31 is the detachment instruction, the processor 32 transmits the signal to the sensor attachment/detachment device 10*a* via the transmitter 38. The transmitter 38 transmits the signal to the sensor attachment/detachment device 10*a* according to the instruction from the processor 32 (step S206).

The release execution portion 14 of the sensor attachment/detachment device 10*a* performs a process of decreasing the adhesive force of the bonding member 13 in response to the signal transmitted from the transmitter 38. For example, the release execution portion 14 decreases the adhesive force of the bonding member 13 by energizing the bonding member 13. As a result, the bonding member 13 is released from the object O.

The user operates the operation unit 21 of the remote control device 20 and inputs an instruction for taking off the moving body 30 to the remote control device 20 at a timing in which the sensor 12 seems to be released from the object O. The control circuit 22 of the remote control device 20 transmits a control signal including the movement instruction for taking off the moving body 30 to the moving body 30 via the communicator 23 in response to the input instruction (step S208).

The communicator 31 of the moving body 30 receives the control signal transmitted from the remote control device 20. The communicator 31 outputs the received control signal to the processor 32. Since the control signal received by the communicator 31 is an instruction related to a movement instruction, the processor 32 instructs the controller 35 to move the moving body 30. The controller 35 rotationally drives the motor 36 and gives power to the rotor 37 so that the moving body 30 takes off (step S209).

Next, the user operates the operation unit 21 of the remote control device 20 and inputs an instruction for moving the moving body 30 to the remote control device 20. The control circuit 22 of the remote control device 20 transmits a control signal including the movement instruction for moving the moving body 30 to the moving body 30 via the communicator 23 in response to the input instruction (step S210).

The communicator 31 of the moving body 30 receives the control signal transmitted from the remote control device 20. The communicator 31 outputs the received control signal to the processor 32. Since the control signal received by the communicator 31 is an instruction related to a movement instruction, the processor 32 instructs the controller 35 to land the moving body 30. The controller 35 controls the rotation of the motor 36 and gives power to the rotor 37 to rotate a plurality of propellers so that the moving body 30 is moved (step S211).

According to the sensor attachment/detachment system 100 with the above-described configuration, the sensor 12 can be attached and detached by operating the moving body 30. Accordingly, the user may not directly attach and detach the sensor 12. Therefore, it is possible to easily attach the sensor 12 to the object O which is the inspection object and detach the sensor 12 from the object O. Further, it is possible to decrease the effort for attaching and detaching the sensor 12.

Hereinafter, modified examples of the second embodiment will be described.

FIRST MODIFIED EXAMPLE OF SECOND EMBODIMENT

Figure 10:
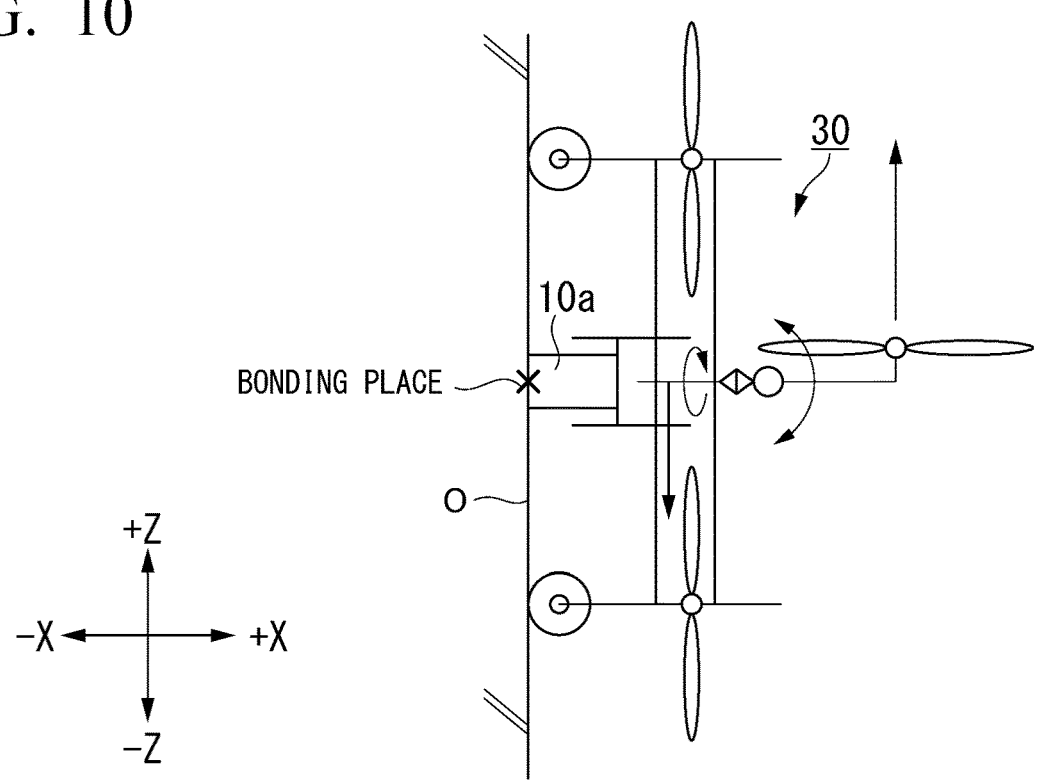
FIG. 10 is a (first) diagram showing another example of an object.
Figure 11:
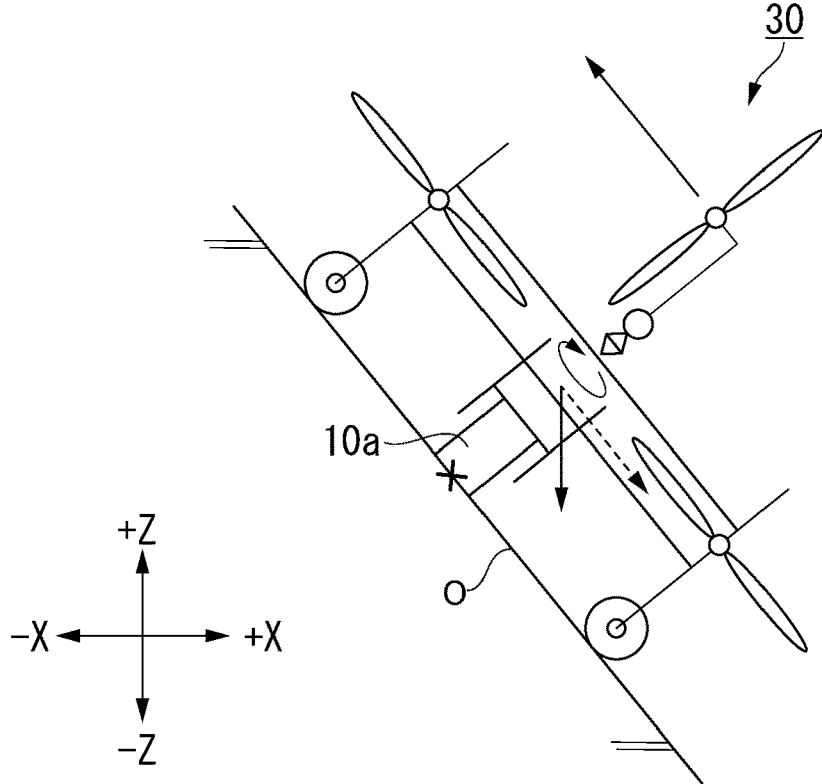
FIG. 11 is a (second) diagram showing another example of the object.

In the above-described example, a configuration in which the object O corresponding to the attachment object of the sensor 12 has a surface parallel to the X direction is shown. The object O which is the attachment object of the sensor 12 may be the object O shown in FIG. 10 or 11. FIG. 10 is a (first) diagram showing another example of the object O. The object O shown in FIG. 10 is an object having a surface parallel to the Z direction. For example, the object O of FIG. 10 is a wall surface or the like of the structure. FIG. 11 is a (second) diagram showing another example of the object O. The object O shown in FIG. 11 is an object which does not have a surface parallel to the X direction and a surface parallel to the Z direction. For example, the object O shown in FIG. 11 is an object having a surface of a predetermined inclination.

SECOND MODIFIED EXAMPLE OF SECOND EMBODIMENT

Figure 12:
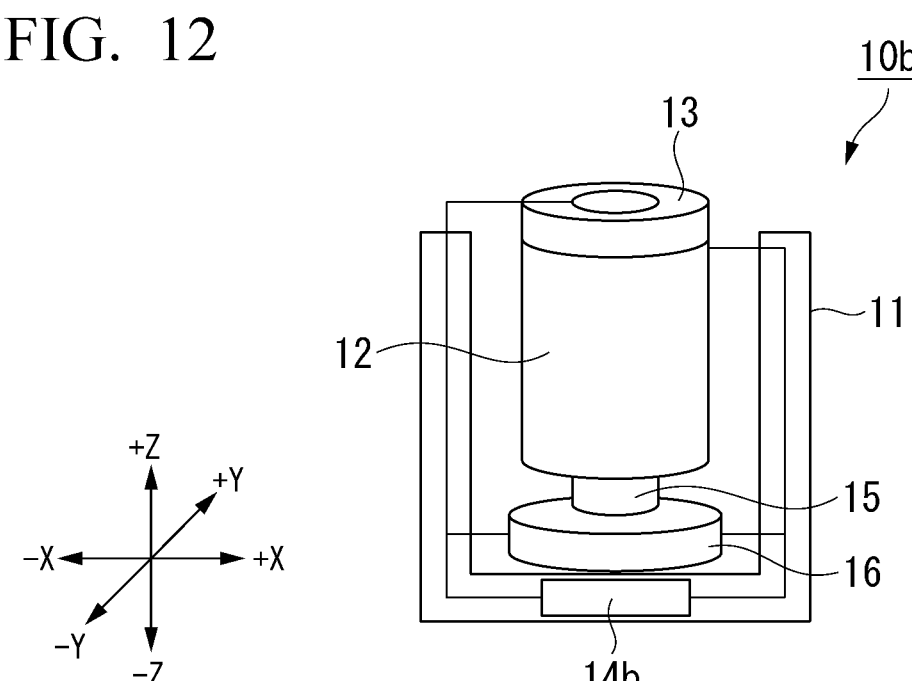
FIG. 12 is a diagram showing a configuration example of a sensor attachment/detachment device of a modified example.

The sensor attachment/detachment device 10*a* may include a push solenoid (pressing portion). FIG. 12 is a diagram showing a configuration example of a sensor attachment/detachment device 10*b* of the modified example. The sensor attachment/detachment device 10*b* includes the support portion 11, the sensor 12, the bonding member 13, a release execution portion 14*b*, the adhesive portion 15, and a push solenoid 16. The sensor attachment/detachment device 10*b* is different from the sensor attachment/detachment device 10*a* in that the release execution portion 14*b* is provided instead of the release execution portion 14 and the push solenoid 16 is further provided. The other configurations of the sensor attachment/detachment device 10*b* are the same as those of the sensor attachment/detachment device 10*a*. Here, the configurations of the release execution portion 14*b* and the push solenoid 16 will be described.

The release execution portion 14*b* performs a process of releasing the bonding member 13 from the object by decreasing the adhesive force of the bonding member 13. Further, the release execution portion 14*b* operates the push solenoid 16 by applying a voltage to the push solenoid 16. Specifically, the release execution portion 14*b* operates the push solenoid 16 so that the pressing force by the push solenoid 16 becomes a predetermined pressing force (for example, a force exceeding xN). Additionally, when the sensor 12 is attached to the object O in the sensor attachment/detachment device 10*b*, the support portion 11, the adhesive portion 15, and the push solenoid 16 are detached.

The push solenoid 16 is a member capable of pressing the sensor 12 with a predetermined pressing force (for example, a force exceeding xN). The push solenoid 16 is provided between the support portion 11 and the adhesive portion 15. Even when a thrust in the attachment direction of the sensor 12 (sensor attachment direction) by the moving body 30 is a predetermined thrust (for example, a thrust exceeding xN), the bonding member 13 may not contact the object O with a predetermined thrust (for example, when a deposit or the like intervenes between the support portion 11 and the object O). Here, it is possible to reliably give a predetermined pressing force to the object O of the sensor 12 and to reliably attach the sensor 12 to the object O by applying a pressing force while pressing the sensor 12 to +Z in the Z direction by the push solenoid 16. Additionally, when the push solenoid 16 is provided, the bonding member 13 does not have to protrude by an arbitrary protrusion amount from the support portion 11 to +Z in the Z direction while not coming into contact with the object O.

THIRD MODIFIED EXAMPLE OF SECOND EMBODIMENT

Figure 13:
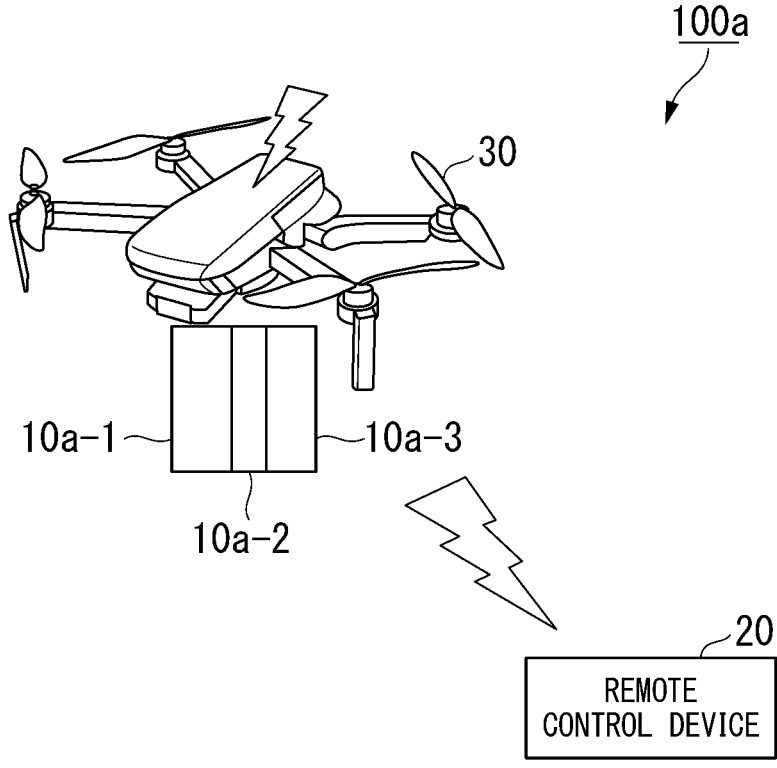
FIG. 13 is a diagram showing a system configuration of the sensor attachment/detachment system of the modified example.

In the above-described embodiments, a configuration in which the moving body 30 attaches one sensor attachment/detachment device 10*a* to the object O at one time is shown. The moving body 30 may be configured to attach the plurality of sensor attachment/detachment devices 10*a* to the object O at one time. In such a configuration, the moving body 30 is configured to hold the plurality of sensor attachment/detachment devices 10*a* at the same time. FIG. 13 is a diagram showing a system configuration of a sensor attachment/detachment system 100*a* of the modified example. The sensor attachment/detachment system 100*a* includes the plurality of sensor attachment/detachment devices 10*a* (10*a*-1, 10*a*-2, 10*a*-3), the remote control device 20, and the moving body 30. Additionally, FIG. 13 shows a configuration in which the moving body 30 holds three sensor attachment/detachment devices 10*a* at the same time, but the moving body 30 may hold two sensor attachment/detachment devices 10*a* or four or more sensor attachment/detachment devices 10*a*. The sensor attachment/detachment device 10*b* may be used instead of the sensor attachment/detachment device 10*a*.

The moving body 30 attaches each sensor attachment/detachment device 10*a* to the object O in response to the instruction from the remote control device 20. Additionally, when the plurality of sensor attachment/detachment devices 10*a* are held at the same height, a case in which the plurality of sensor attachment/detachment devices 10*a* are attached to the object O at the same time can be considered. Here, each sensor attachment/detachment device 10*a* may be held by the moving body 30 so that the height differs depending on the installation order.

Figure 14:
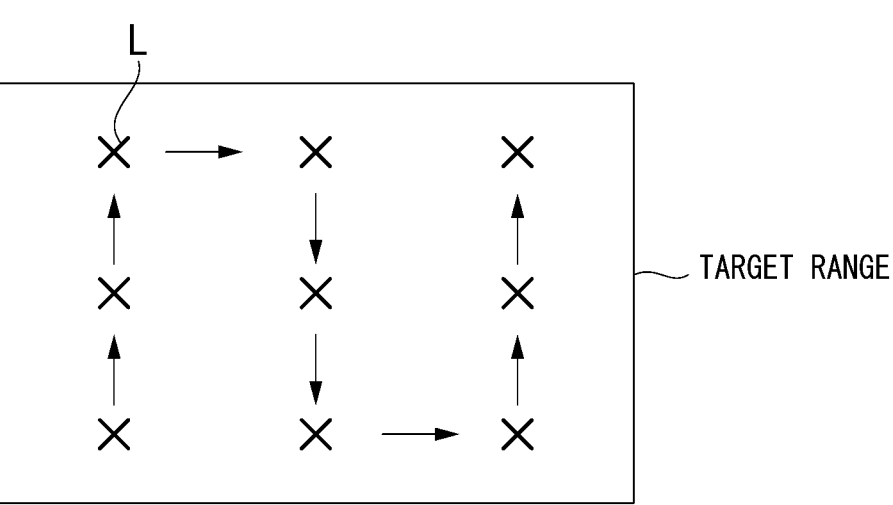
FIG. 14 is a diagram showing a detailed example of a path when a moving body attaches a plurality of sensors to the object.

The moving body 30 may be configured to move along a predetermined path while keeping a constant distance with the object O regardless of the instruction from the remote control device 20 and to attach each sensor 12 provided to each sensor attachment/detachment device 10*a* to the object O at a predetermined interval. FIG. 14 is a diagram showing a detailed example of the path when the moving body 30 attaches the plurality of sensors 12 to the object O. In FIG. 14, the place indicated by X mark L indicates the attachment position of the sensor 12. The moving body 30 moves from the lower left X mark L toward the direction indicated by the arrow, and attaches the sensor 12 at each position of the X mark L. In such a configuration, the information on the path on which the moving body 30 moves is stored in a storage unit (not shown) in the moving body 30. The controller 35 determines whether or not to attach the sensor 12 on the basis of the movement amount measured by the moving amount sensor 33 and performs the sensor bonding process as in the embodiment when it is determined that the sensor 12 is attached. For example, the moving body 30 may store information on the movement amount to attach the sensor 12 in advance and determine whether or not to attach the sensor 12 when the moving body 30 moves the distance indicated by the information on the movement amount.

FOURTH MODIFIED EXAMPLE OF SECOND EMBODIMENT

In the above-described embodiments, a configuration in which the attachment of the sensor 12 and the detachment of the sensor 12 are performed by the moving body 30 is shown, but any one of the attachment of the sensor 12 and the detachment of the sensor 12 may be manually performed. For example, the sensor 12 may be manually attached and the moving body 30 and the sensor 12 may be detached. Alternatively, the moving body 30 and the sensor 12 may be attached and the sensor 12 may be manually detached.

When the sensor 12 is manually attached and the moving body 30 and the sensor 12 are detached, the attachment of the sensor 12 may be performed by the sensor attachment process shown in the first embodiment and the detachment of the sensor 12 may be performed by the sensor detachment process shown in the second embodiment.

When the moving body 30 and the sensor 12 are attached and the sensor 12 is manually detached, the attachment of the sensor 12 may be performed by the sensor attachment process shown in the second embodiment and the detachment of the sensor 12 may be performed by the sensor detachment process shown in the first embodiment.

FIFTH MODIFIED EXAMPLE

In the above-described embodiments, a configuration in which an instruction for detaching the bonding member 13 from the object O is transmitted from the moving body 30 to the sensor attachment/detachment device 10*a* is shown. The instruction for detaching the bonding member 13 from the object O may be directly transmitted from the remote control device 20 to the sensor attachment/detachment device 10*a*. The direction transmission from the remote control device 20 to the sensor attachment/detachment device 10*a* means that the instruction is transmitted from the remote control device 20 to the sensor attachment/detachment device 10*a* without using the moving body 30. In such a configuration, the control circuit 22 of the remote control device 20 transmits the instruction to the sensor attachment/detachment device 10*a* via the communicator 23 when the instruction input via the operation unit 21 is the instruction for detaching the bonding member 13 from the object O.

OTHER MODIFIED EXAMPLES

In the first embodiment, the sensor attachment/detachment device 10*a* or the sensor attachment/detachment device 10*b* may be used instead of the sensor attachment/detachment device 10.

In the first embodiment and the second embodiment, a configuration in which each of the sensor attachment/detachment devices 10, 10*a*, and 10*b* has both a function of attaching the sensor 12 to the object O and a function of detaching the sensor 12 from the object O is shown. Here, each function may be provided in different devices as in the case of the sensor attachment device only having a function of attaching the sensor 12 to the object O and the sensor detachment device only having a function of detaching the sensor 12 from the object O. In such a configuration, the sensor attachment device only having a function of attaching the sensor 12 to the object O may include at least the support portion 11, the sensor 12, and the bonding member 13. Then, the sensor attachment device may include the adhesive portion 15 or the push solenoid if necessary. The sensor detachment device only having a function of detaching the sensor 12 from the object O may include at least the support portion 11 and the release execution portion 14. Then, the sensor detachment device may include the adhesive portion 15 if necessary.

According to at least one embodiment described above, since the sensor 12, the bonding member 13 bonded to the first surface of the sensor 12 and having a function of decreasing the adhesive force, the support portion 11 capable of supporting the sensor 12 by directly contacting the second surface of the sensor 12 or via another functional portion, and the release execution portion 14 performing a process of releasing the bonding member 13 from the object O by decreasing the adhesive force of the bonding member 13 after the sensor 12 is attached to the object O by the bonding member 13 are provided, it is possible to easily attach the sensor to the object which is an inspection object or detach the sensor from the object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor attachment/detachment device comprising:

a sensor;

a bonding member that is bonded to a first surface of the sensor and has a function of decreasing an adhesive force;

a support portion which is capable of supporting the sensor by directly contacting a second surface of the sensor or via another functional portion; and a release execution portion configured to perform a process of releasing the bonding member from an object by decreasing the adhesive force of the bonding member after the sensor is attached to the object by the bonding member, wherein the support portion includes a structure in which the sensor can be accommodated inside and a hole for extracting the sensor.

2. The sensor attachment/detachment device according to claim 1, wherein the bonding member has a function of decreasing the adhesive force by either electricity, heat, or light, and wherein the release execution portion releases the bonding member from the object by decreasing the adhesive force of the bonding member by the action of either electricity, heat, or light.

3. The sensor attachment/detachment device according to claim 1, wherein the another functional portion includes an adhesive portion adhering the sensor and the support portion, and wherein the adhesive force of the adhesive portion is smaller than a bonding force of the bonding member with respect to the object.

4. The sensor attachment/detachment device according to claim 1, wherein the another functional portion includes a pressing portion which presses the sensor against the object with a predetermined pressing force, and wherein the pressing portion presses the sensor against the object with a predetermined pressing force so that the sensor is bonded to the object.

\* \* \* \* \*